(12) United States Patent
Laird et al.

(10) Patent No.: US 9,471,072 B1
(45) Date of Patent: Oct. 18, 2016

(54) SELF-ADAPTIVE VOLTAGE SCALING

(71) Applicant: Western Digital Technologies, Inc., Irvine, CA (US)

(72) Inventors: William K. Laird, Corona, CA (US); John R. Agness, Laguna Hills, CA (US)

(73) Assignee: WESTERN DIGITAL TECHNOLOGIES, INC, Irvine, CA (US)

( * ) Notice: Subject to any disclaimer, the term of this patent is extended or adjusted under 35 U.S.C. 154(b) by 101 days.

(21) Appl. No.: 14/322,438

(22) Filed: Jul. 2, 2014

Related U.S. Application Data (60) Provisional application No. 61/904,423, filed on Nov. 14, 2013.

(51) Int. Cl.
*H02M 3/157* (2006.01)
*G05F 1/46* (2006.01)

(52) U.S. Cl.
CPC ..................................... *G05F 1/462* (2013.01)

(58) Field of Classification Search
CPC ............................ H02M 3/156; H02M 3/157
USPC .................................. 323/282, 283, 284, 285
See application file for complete search history.

(56) References Cited

U.S. PATENT DOCUMENTS

| | | |
|---|---|---|
| 6,014,283 A | 1/2000 | Codilian et al. |
| 6,052,076 A | 4/2000 | Patton, III et al. |
| 6,052,250 A | 4/2000 | Golowka et al. |
| 6,067,206 A | 5/2000 | Hull et al. |
| 6,078,453 A | 6/2000 | Dziallo et al. |
| 6,091,564 A | 7/2000 | Codilian et al. |
| 6,094,020 A | 7/2000 | Goretzki et al. |
| 6,101,065 A | 8/2000 | Alfred et al. |
| 6,104,153 A | 8/2000 | Codilian et al. |
| 6,122,133 A | 9/2000 | Nazarian et al. |
| 6,122,135 A | 9/2000 | Stich |
| 6,141,175 A | 10/2000 | Nazarian et al. |
| 6,160,368 A | 12/2000 | Plutowski |
| 6,181,502 B1 | 1/2001 | Hussein et al. |
| 6,195,222 B1 | 2/2001 | Heminger et al. |
| 6,198,584 B1 | 3/2001 | Codilian et al. |
| 6,198,590 B1 | 3/2001 | Codilian et al. |
| 6,204,988 B1 | 3/2001 | Codilian et al. |
| 6,243,223 B1 | 6/2001 | Elliott et al. |
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,425,086 B1 | 7/2002 | Clark et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |

(Continued)

*Primary Examiner* — Jeffrey Sterrett (57) ABSTRACT

A regulator circuit includes: a current detector configured to sense a load current and convert the sensed load current to a DC current sense signal; and an adjustment circuit configured to adjust an output voltage within predetermined upper and lower voltage limits based on the DC current sense signal.

14 Claims, 7 Drawing Sheets

(56) References Cited

U.S. PATENT DOCUMENTS

| | | | |
|---|---|---|---|
| 6,519,707 B2 | 2/2003 | Clark et al. |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,203,847 B2 | 4/2007 | Park |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett et al. |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,486,060 B1 | 2/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,500,124 B2 | 3/2009 | Seo |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |

(56) References Cited

U.S. PATENT DOCUMENTS

| | | |
|---|---|---|
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,734,941 B2 | 6/2010 | Khodorkovsky et al. |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,870,404 B2 | 1/2011 | Read et al. |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,112,048 B2 | 2/2012 | Dor et al. |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,433,940 B2 | 4/2013 | Youngs |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,566,627 B2 | 10/2013 | Halepete et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 2004/0051510 A1* | 3/2004 | Saggini ............... H02M 3/157 323/282 |
| 2004/0095020 A1* | 5/2004 | Kernahan ............ H02M 3/157 307/35 |
| 2009/0195230 A1* | 8/2009 | Adkins ................ H02M 3/156 323/282 |
| 2010/0035085 A1 | 2/2010 | Jung et al. |
| 2010/0072968 A1* | 3/2010 | Bianco ................ H02M 3/156 323/284 |
| 2010/0148708 A1 | 6/2010 | Jorgenson et al. |
| 2010/0281284 A1 | 11/2010 | Kasprzak et al. |
| 2012/0284493 A1 | 11/2012 | Lou et al. |
| 2013/0082675 A1* | 4/2013 | Capodivacca ........ G05F 1/468 |

(56) References Cited

U.S. PATENT DOCUMENTS

| | | |
|---|---|---|
| 2013/0120870 A1 | 5/2013 | Zhou et al. |
| 2013/0148240 A1 | 6/2013 | Ferris et al. |
| 2013/0154568 A1 | 6/2013 | Li et al. |
| 2014/0097814 A1* | 4/2014 | Brewster ............... H02M 3/156 323/282 |
| 2015/0035510 A1* | 2/2015 | Hoshino ............... H02M 3/157 323/283 |

* cited by examiner

SELF-ADAPTIVE VOLTAGE SCALING

CROSS-REFERENCE TO RELATED APPLICATION(S)

This application claims the benefit of U.S. Provisional Application No. 61/904,423 filed Nov. 14, 2013, the disclosure of which is hereby incorporated in its entirety by reference.

BACKGROUND

1. Technical Field

Apparatuses and methods consistent with the present inventive concept relate to power supplies, and more particularly to self-adaptive voltage scaling for power supply regulation.

2. Related Art

A System-On-Chip (SOC) may provide the components necessary to control operation of a storage device, for example, a hard disk drive, a hybrid hard drive, etc. The SOC may have different operational modes, for example, an idle mode during which the SOC consumes a least amount of power and an active mode during which the SOC consumes significantly more power than the idle mode.

BRIEF DESCRIPTION OF THE DRAWINGS

Aspects and features of the present inventive concept will be more apparent by describing example embodiments with reference to the accompanying drawings, in which.

DETAILED DESCRIPTION

While certain embodiments are described, these embodiments are presented by way of example only, and are not intended to limit the scope of protection. The methods and systems described herein may be embodied in a variety of other forms. Furthermore, various omissions, substitutions, and changes in the form of the example methods and systems described herein may be made without departing from the scope of protection.

Overview

During the active mode of the SOC, SOC operation can cause high power supply loads and large load steps. Power supply regulators must be designed to handle maximum output current, for example, 2 amps (A) as well as sudden load increases, for example, a load step from 200 mA to 2 A (i.e., a load step of 1.8 A) within microseconds, while maintaining the output voltage within upper and lower specification limits.

However, the storage device may be operating in idle mode at low current for an extended period of time. If the power supply regulator output voltage is set to handle a large current step while staying within specification during a load step, but the load step does not happen for a long time, power is wasted.

Figure 1:
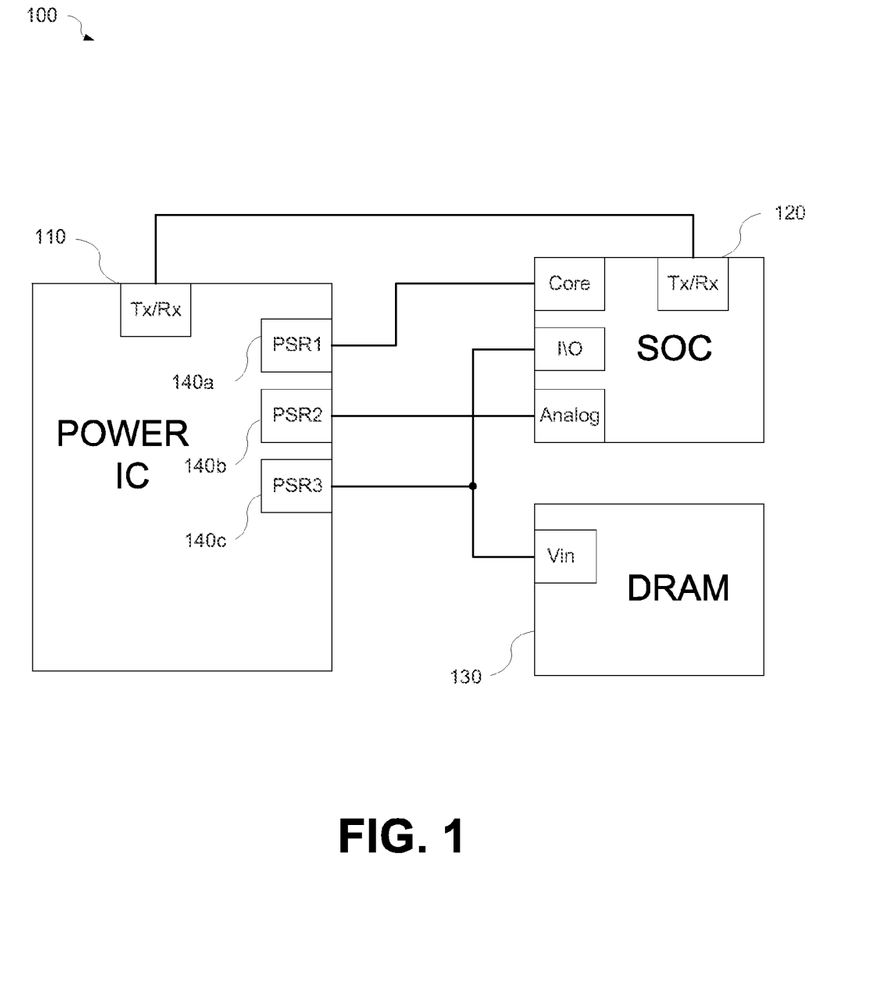
FIG. 1 is a block diagram illustrating a power system according to example embodiments of the present inventive concept.

FIG. 1 is a block diagram illustrating a power system according to example embodiments of the present inventive concept. Referring to FIG. 1, a power integrated circuit (IC) 110 may include one or more regulators 140a-140c to provide regulated output voltages and/or currents. One or more regulated output voltages may be supplied to various devices, i.e., loads, for example, but not limited to, an SOC 120, a memory 130, etc. Each load may have voltage and current requirements that a regulator 140a-140c maintains within predetermined upper and lower limits.

Figure 2:
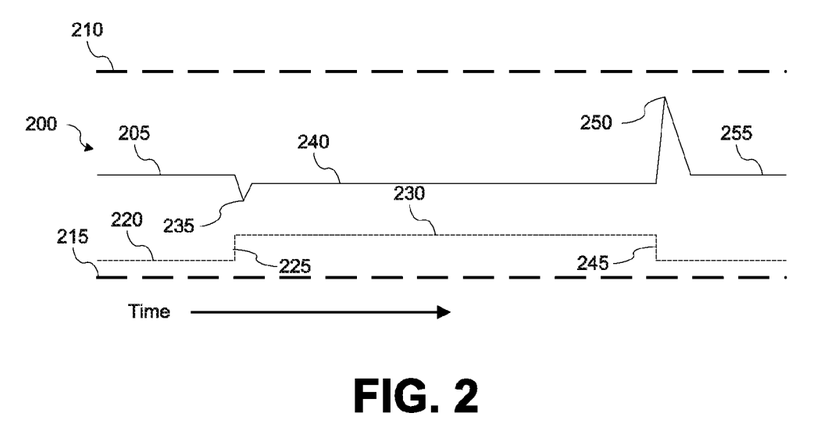
FIG. 2 is a graph illustrating an output voltage response to a load for a conventional regulated power supply.

FIG. 2 is a graph illustrating an output voltage response to an SOC load for a conventional regulated power supply. As illustrated in FIG. 2, a power supply regulator provides an output voltage 200 between an upper voltage limit 210 and a lower voltage limit 215. With the storage device operating in idle mode for an extended period of time, the SOC may require only a low operating current 220, for example, about 200 mA, and the power supply regulator operates to maintain a specified output voltage 205.

However, a transition of the storage device to an active mode may result in a step 225 in load current, for example, up to 2 A 230, by the SOC. As a result of the step 225 in load current, the specified output voltage 205 may drop 235 and then achieve a steady state voltage 240 lower than the specified output voltage 205 during idle mode operation. Similarly, when the storage device returns to idle mode operation, the load current requirement of the SOC drops 245 causing a large spike 250 in the output voltage 200 before the output voltage achieve a steady state 255.

Some embodiments of the present inventive concept provide apparatuses and methods for self-adaptive voltage scaling for power supply regulation.

Regulator Circuit

Figure 3:
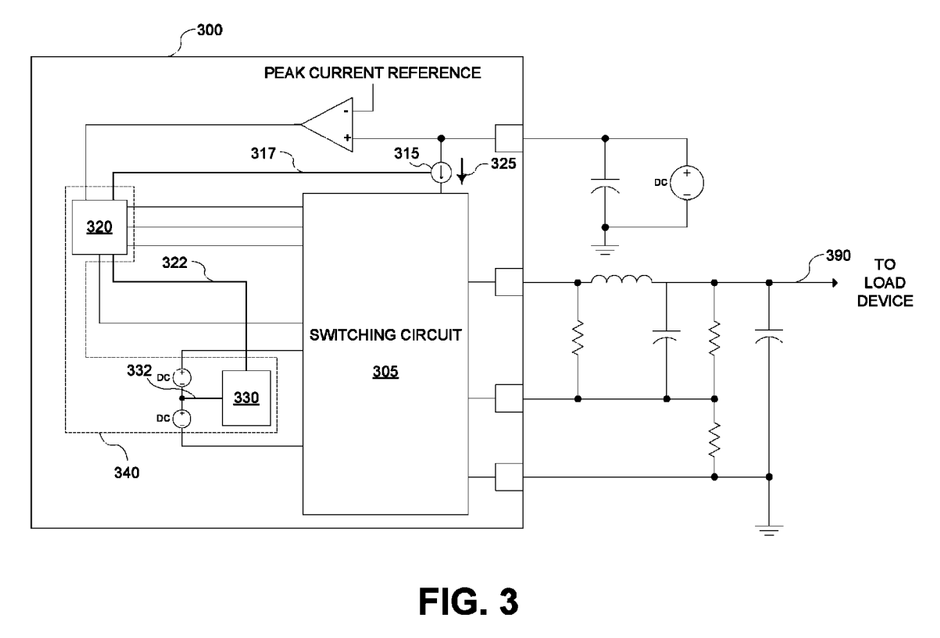
FIG. 3 is a circuit diagram illustrating a regulator circuit according to example embodiments of the present inventive concept.

FIG. 3 is a circuit diagram illustrating a regulator circuit according to example embodiments of the present inventive concept. The regulator circuit 300 may include a switching circuit 305, a current detector 315, a logic circuit 320, a digital-to-analog converter (DAC) 330, and an adjustment circuit 340.

The switching circuit 305 may be configured to generate a duty cycle to regulate an output voltage 390. The current detector 315 may be configured to sense a load current 325 and convert the sensed load current to a DC current sense signal 317. The DC current sense signal 317 may be a voltage signal.

The adjustment circuit 340 may include a logic circuit 320, and a digital-to-analog converter (DAC) 330. The logic circuit 320 may be configured to input the DC current sense signal 317 and generate an adjustment signal 322 based on the DC current sense signal 317. The DAC 330 may be configured to input the adjustment signal 322 and generate an output voltage control signal 332 based on the adjustment signal 322. If the DC current sense signal 317 is increasing, the output voltage control signal 332 may provide an increasing feedback voltage to the switching circuit 305 that is proportional to the increasing load current 325. If the DC current sense signal 317 is decreasing, the output voltage control signal 332 may provide a decreasing feedback voltage to the switching circuit 305 that is proportional to the decreasing load current 325.

The output voltage control signal 332 generated by the DAC 330 may cause the output voltage 390 to increase or decrease within predetermined upper and lower limits. In various embodiments, the output voltage 390 may be adjusted within the predetermined upper and lower voltage limits proportionally to changes in the DC current sense signal 317.

Figure 4:
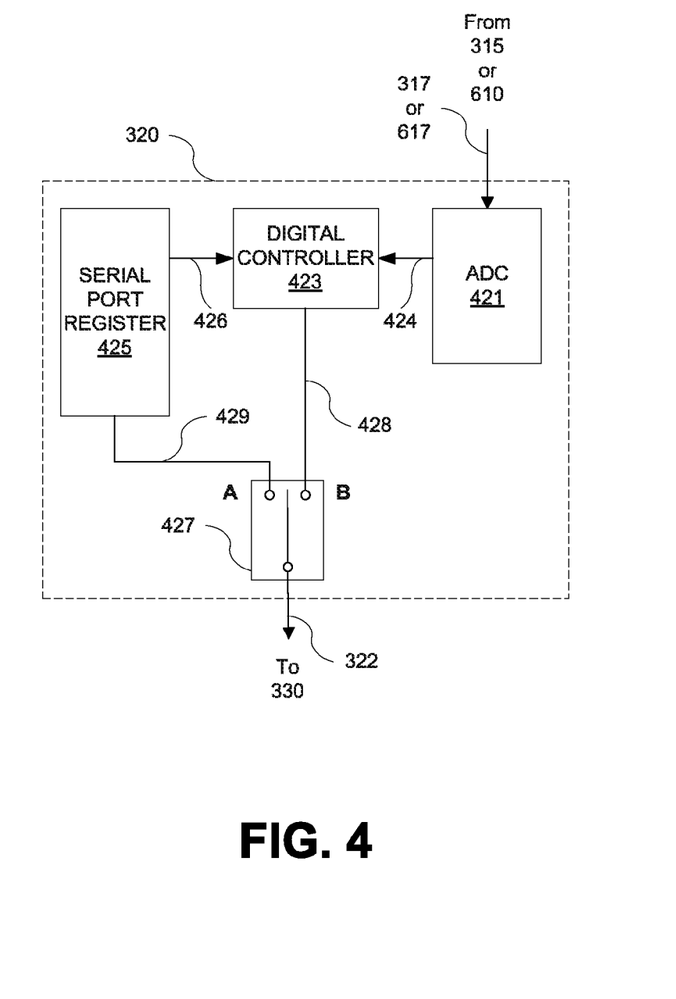
FIG. 4 is a block diagram illustrating a logic circuit according to example embodiments of the present inventive concept.

FIG. 4 is a block diagram illustrating a logic circuit according to example embodiments of the present inventive concept. Referring to FIGS. 3 and 4, the logic circuit 320 may include an analog-to-digital converter (ADC) 421, a digital controller 423, a serial port register 425, and a switch 427.

The ADC 421 may be configured to input the DC current sense signal 317 and based on the DC current sense signal 317 generate an ADC output signal 424 to the digital controller 423. The serial port register 425 may be user-programmable. Upper and lower output voltage limits may be programmed in the serial port register 425. The serial port register 425 may be configured to generate a register output signal 426 to the digital controller 423 indicating the predetermined upper and lower output voltage limits. The serial port register 425 may be further configured to generate a first DAC setting signal 429.

The digital controller 423 may be configured to input the ADC output signal 424 from the ADC 421 and the register output signal 426 from the serial port register 425 and based on those signals determine a setting for the DAC 330 and output a second DAC setting signal 428.

The switch 427 may be configured to select a first position "A" or to a second position "B". With the switch 427 in position "A", the first DAC setting signal 429 from the serial port register 425 may be output from the logic circuit as the adjustment signal 322 to the DAC 330.

With the switch 427 in position "B", the regulator circuit 300 may be in a self-adaptive voltage scaling mode according to various embodiments, and the second DAC setting signal 428 from the digital controller may be output from the logic circuit 320 as the adjustment signal 322 to the DAC 330.

In various embodiments, the adjustment circuit 340 may be configured to adjust the output voltage 390 to a predetermined minimum output voltage in response to a value of the DC current sense signal 317 less than a threshold value, and to adjust the output voltage 390 higher than the predetermined minimum output voltage in response to a value of the DC current sense signal 317 equal to or greater than the threshold value.

Figure 5:
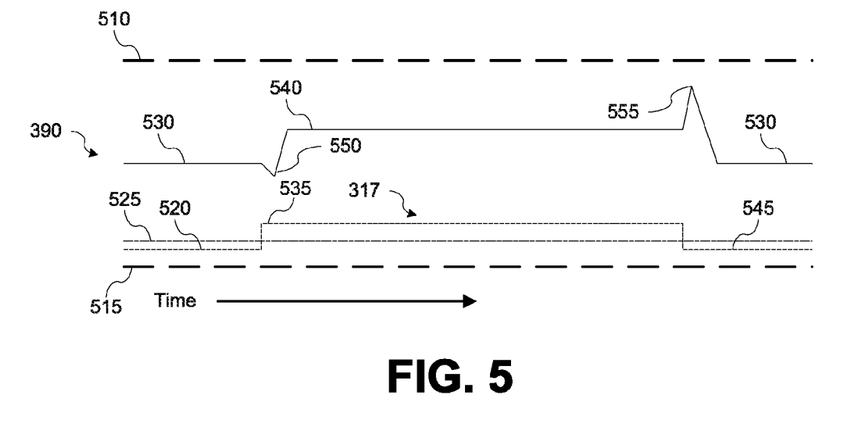
FIG. 5 is a graph illustrating an output voltage response to a load for a regulated power supply in a self-adaptive voltage scaling mode according to example embodiments of the present inventive concept.

FIG. 5 is a graph illustrating an output voltage response to a load for a regulated power supply operating in a self-adaptive voltage scaling mode according to example embodiments of the present inventive concept. FIG. 5 shows the output voltage 390 response to changes in the DC current sense signal 317 resulting from changes in the load current 325. Referring to FIGS. 3-5, a regulator circuit 300 operating in a self-adaptive voltage scaling mode may operate to maintain an output voltage 390 between a predetermined upper voltage limit 510 and a predetermined lower voltage limit 515. For a low load current 325, for example, about 200 mA, the value 520 of the DC current sense signal 317 may be less than a predetermined threshold value 525.

In response to a value of the DC current sense signal 317 less than the predetermined threshold value 525, the regulator circuit 300 may adjust the output voltage 390 to a predetermined minimum output voltage 530. When the load current 325 increases, the value of the DC current sense signal 317 may increase to a value 535 equal to or greater than the predetermined threshold value 525. In response, the regulator circuit 300 may adjust the output voltage 390 to a value 540 higher than the predetermined minimum output voltage 530. Similarly, when the load current 325 again decreases, the value of the DC current sense signal 317 may decrease to a value 545 below the predetermined threshold value 525, the regulator circuit 300 may adjust the output voltage 390 back to the predetermined minimum output voltage 530.

It should also be noted that for step increases and decreases in load current 325, output voltage 390 undershoot 550 and overshoot 555 may be reduced for the regulator circuit 300 operating in a self-adaptive voltage scaling mode according to various embodiments as compared to conventional regulator circuit operation.

Figure 6:
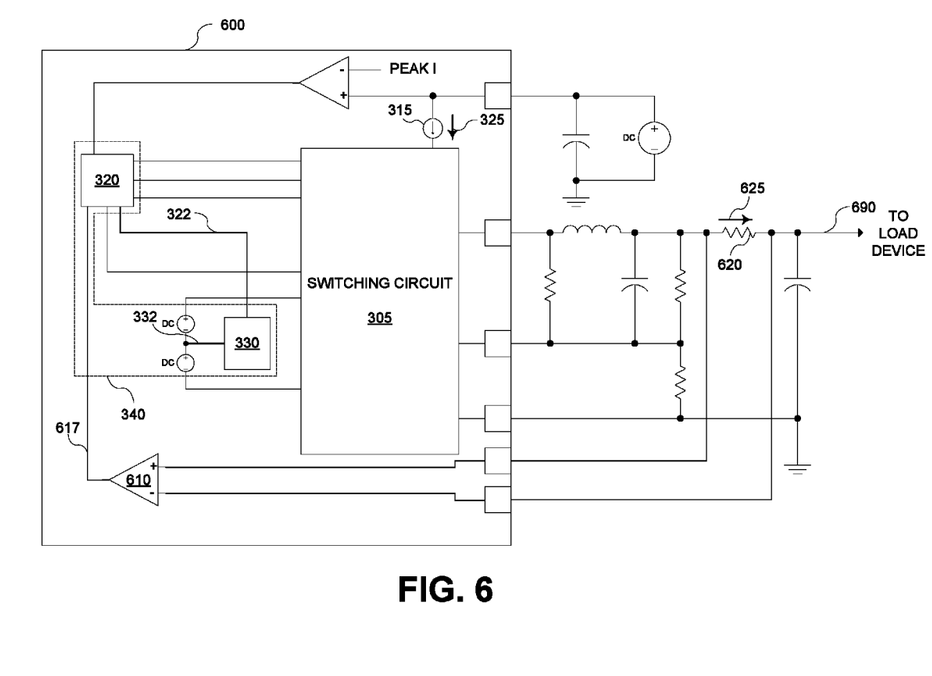
FIG. 6 is a circuit diagram illustrating a regulator circuit according to example embodiments of the present inventive concept.

FIG. 6 is a circuit diagram illustrating a regulator circuit according to example embodiments of the present inventive concept. The regulator circuit 600 may include a switching circuit 305, a logic circuit 320, a digital-to-analog converter (DAC) 330, an adjustment circuit 340, and an amplifier 610.

The switching circuit 305, logic circuit 320, DAC 330, and adjustment circuit 340 operate as described with respect to FIG. 3 and their operation will not be further explained here.

The amplifier 610 may be configured to sense a voltage drop across a first resistive element 620 resulting from a load current 625 flowing through the first resistive element 620. The first resistive element 620 may be, for example, but not limited to, one or more fixed or trimmable resistors, or other resistive device producing a voltage drop proportional to current through the device.

The amplifier 610 may be configured to convert the sensed load current 625 to a DC current sense signal 617. The DC current sense signal 617. may be a voltage signal. The DC current sense signal 617 may be input to the logic circuit 320 in the adjustment circuit 340, and operation of the regulator circuit 600 may be as explained with respect to FIGS. 3 and 5, where the DC current sense signal 617 from the amplifier 610 may be input to the logic circuit 320 in place of the DC current sense signal 317 from the current detector 315.

Figure 7:
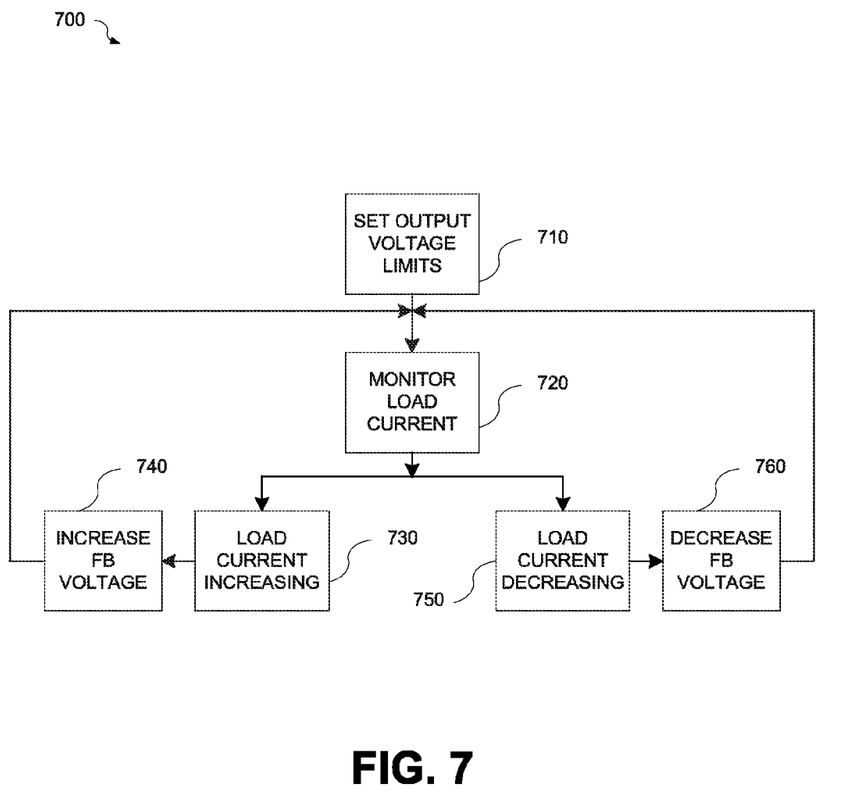
FIG. 7 is a flow chart illustrating a method according to example embodiments of the present inventive concept.

FIG. 7 is a flow chart illustrating a method according to example embodiments of the present inventive concept. Referring to FIGS. 3-7, the upper and lower output voltage limits may be set by programming the serial port register 425. The serial port register 425 may be configured to generate a register output signal 426 to the digital controller 423 indicating the predetermined upper and lower output voltage limits (710).

In some embodiments, load current 325 may be monitored using a current detector 315 that may be configured to sense the load current 325 and convert the sensed load current to a DC current sense signal 317 (720). In some embodiments, load current 625 may be monitored using an amplifier 610 that may be configured to sense a voltage drop across a first resistive element 620 resulting from the load current 625 flowing through a first resistive element 620 and generate a DC current sense signal 617 (720).

If the load current 325, 625 is increasing (730), the DAC 330 may generate an output voltage control signal 332 to increase feedback voltage to the switching circuit 305 (740). The logic circuit 320 may generate an adjustment signal 322 to the DAC 330 based on the DC current sense signal 317, 617 to generate an increasing feedback voltage to the switching circuit 305 that is proportional to the increasing load current 325, 625.

If the load current 325, 625 is decreasing (750), the DAC 330 may generate an output voltage control signal 332 to decrease feedback voltage to the switching circuit 305 (760). The logic circuit 320 may generate an adjustment signal 322 to the DAC 330 based on the DC current sense signal 317, 617 to generate a decreasing feedback voltage proportional to the decreasing load current 325, 625.

Figure 8:
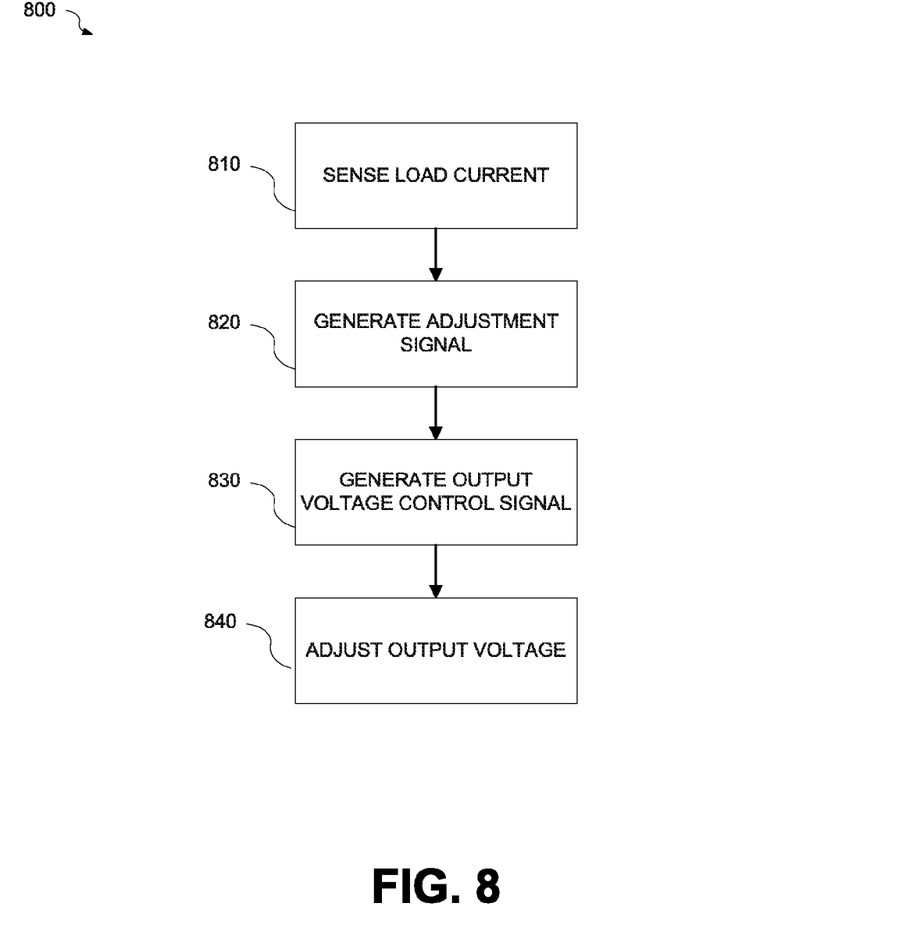
FIG. 8 is a flow chart illustrating another method according to example embodiments of the present inventive concept.

FIG. 8 is a flow chart illustrating another method according to example embodiments of the present inventive concept. Referring to FIGS. 3-8, in some embodiments, load current may be sensed using a current detector 315 that may be configured to sense a load current 325 and convert the sensed load current to a DC current sense signal 317 (810). In some embodiments, load current may be sensed using an amplifier 610 that may be configured to sense a voltage drop across a first resistive element 620 resulting from the load current 625 flowing through a first resistive element 620 and generate a DC current sense signal 617.

The DC current sense signal 317, 617 may be input to a logic circuit 320 in an adjustment circuit 340, and the logic circuit 320 may generate an adjustment signal 322 based on the DC current sense signal 317, 617 (820).

The adjustment signal 322 may be input to a DAC 330, and based on the adjustment signal 322 the DAC 330 may generate an output voltage control signal 332 (830). The output voltage control signal 332 generated by the DAC 330 may cause the output voltage 390, 690 to increase or decrease within predetermined upper and lower limits (840). In various embodiments, the output voltage 390, 690 may be adjusted within the predetermined upper and lower voltage limits proportionally to changes in the DC current sense signal 317.

The output voltage 390, 690 may be adjusted to a predetermined minimum output voltage in response to a value of the sensed load current 325, 625 less than a threshold value, and the output voltage 390, 690 may be adjusted higher than a predetermined minimum output voltage in response to the value of the sensed load current 325, 625 equal to or greater than a threshold value.

While certain embodiments have been described, these embodiments have been presented by way of example only, and are not intended to limit the scope of the protection. The methods and systems described herein may be embodied in a variety of other forms. Various omissions, substitutions, and/or changes in the form of the example methods and systems described herein may be made without departing from the spirit of the protection.

The accompanying claims and their equivalents are intended to cover such forms or modifications as would fall within the scope and spirit of the protection. For example, the example systems and methods disclosed herein can be applied to hard disk drives, hybrid hard drives, and the like. As another example, the various components illustrated in the figures may be implemented as software and/or firmware on a processor, ASIC/FPGA, or dedicated hardware. Also, the features and attributes of the specific example embodiments disclosed above may be combined in different ways to form additional embodiments, all of which fall within the scope of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A regulator circuit, comprising:
a current detector configured to sense a load current and convert the sensed load current to a DC current sense signal; and
an adjustment circuit comprising:
a logic circuit configured to input the DC current sense signal and generate an adjustment signal based on the DC current sense signal; and
a digital-to-analog converter configured to input the adjustment signal and generate an output voltage control signal based on the adjustment signal,
wherein the adjustment circuit is configured to adjust an output voltage within predetermined upper and lower voltage limits based on the DC current sense signal, and
wherein the output voltage control signal causes the output voltage to increase or decrease within the predetermined upper and lower voltage limits.

2. The regulator circuit of claim 1, wherein DC current sense signal is a voltage signal.

3. The regulator circuit of claim 1, wherein in response to a value of the DC current sense signal equal to or greater than a threshold value, the adjustment circuit is further configured to adjust the output voltage higher than a predetermined minimum output voltage.

4. The regulator circuit of claim 1, wherein the adjustment circuit is further configured to increase and decrease the output voltage control signal proportionally to changes in the DC current sense signal.

5. The regulator circuit of claim 1, wherein in response to a value of the DC current sense signal less than a threshold value, the adjustment circuit is further configured to adjust the output voltage to a predetermined minimum output voltage.

6. A regulator circuit, comprising:
a first resistive element configured to sense a load current;
an amplifier configured to convert the sensed load current to a DC current sense signal; and
an adjustment circuit comprising:
a logic circuit configured to input the DC current sense signal and generate an adjustment signal based on the DC current sense signal; and
a digital-to-analog converter configured to input the adjustment signal and generate an output voltage control signal based on the adjustment signal,
wherein the adjustment circuit is configured to adjust an output voltage within predetermined upper and lower voltage limits based on the DC current sense signal, and
wherein the output voltage control signal causes the output voltage to increase and decrease within the predetermined upper and lower voltage limits.

7. The regulator circuit of claim 6, wherein in response to a value of the DC current sense signal equal to or greater than a threshold value, the adjustment circuit is further configured to adjust the output voltage higher than a predetermined minimum output voltage.

8. The regulator circuit of claim 6, wherein DC current sense signal is a voltage signal.

9. The regulator circuit of claim 6, wherein in response to a value of the DC current sense signal less than a threshold value, the adjustment circuit is further configured to adjust the output voltage to a predetermined minimum output voltage.

10. The regulator circuit of claim 6, wherein the adjustment circuit is further configured to increase and decrease the output voltage control signal proportionally to changes in the DC current sense signal.

11. A method for regulating a voltage, the method comprising:
    sensing a load current;
    converting the sensed load current to a DC current sense signal;
    generating a digital adjustment signal based on the DC current sense signal;
    generating an analog output voltage control signal based on the adjustment signal; and
    adjusting the output voltage within predetermined upper and lower voltage limits with the output voltage control signal,
    wherein the output voltage control signal causes the output voltage to increase or decrease within the predetermined upper and lower voltage limits.

12. The method of claim 11, further comprising increasing and decreasing the output voltage control signal proportionally to changes in a DC current sense signal.

13. The method of claim 11, further comprising adjusting the output voltage to a predetermined minimum output voltage in response to a value of the sensed load current less than a threshold value.

14. The method of claim 11, further comprising adjusting the output voltage higher than a predetermined minimum output voltage in response to the value of the sensed load current equal to or greater than a threshold value.

* * * * *